Aug. 10, 1971     J. W. CHRISTENSEN     3,598,536
CHEMICAL FEEDER
Original Filed Aug. 8, 1968
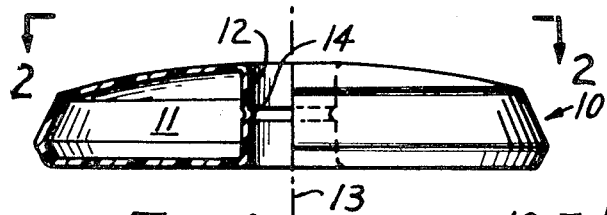
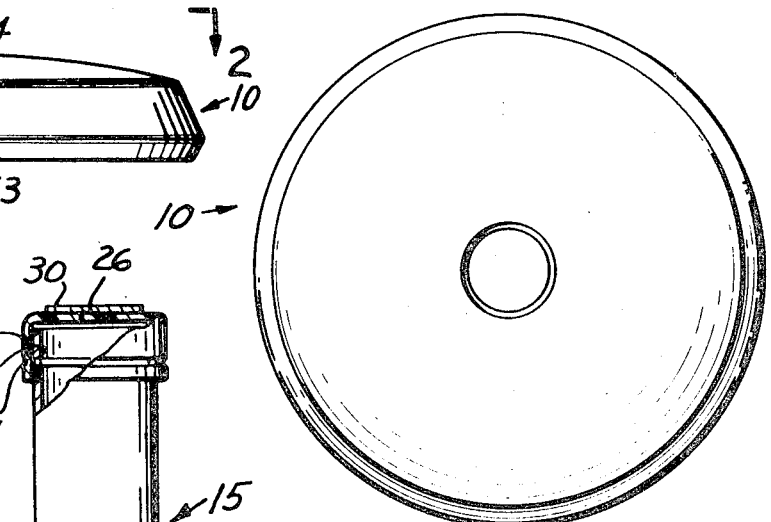
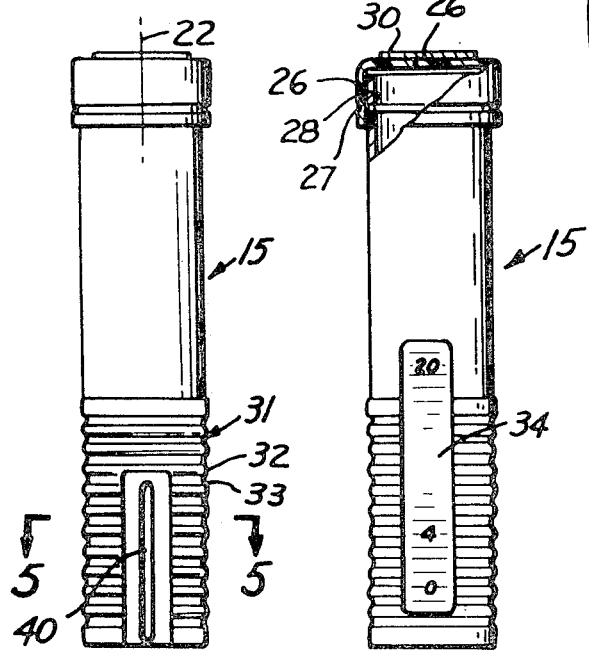
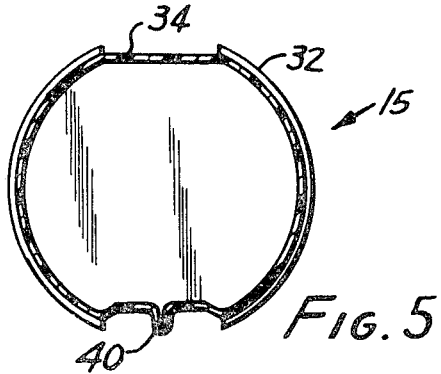
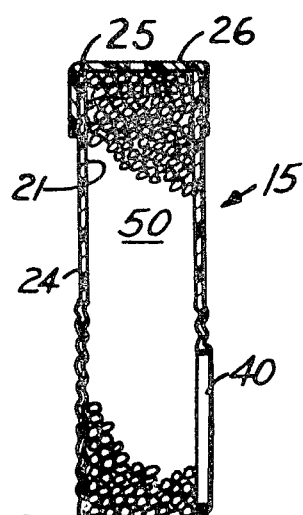
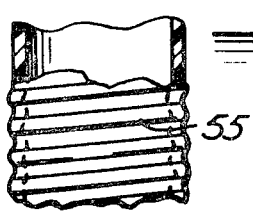
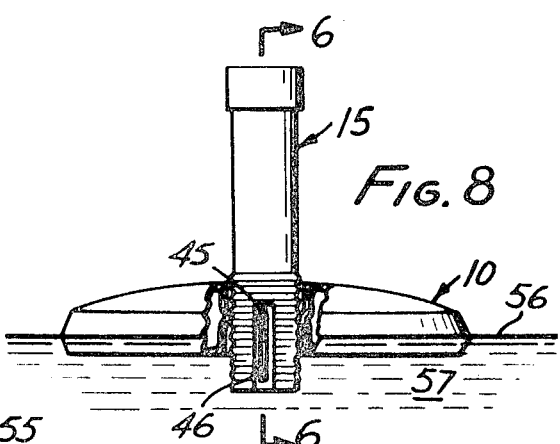
INVENTOR.
JOHN W. CHRISTENSEN
BY Angus & Mon
ATTORNEYS.

United States Patent Office 3,598,536
Patented Aug. 10, 1971

3,598,536
CHEMICAL FEEDER
John W. Christensen, 10534 Wiley Burke,
Downey, Calif. 90241
Continuation of application Ser. No. 719,455, Aug. 8, 1968. This application May 4, 1970, Ser. No. 34,116
Int. Cl. B01f 1/00
U.S. Cl. 23—267A
22 Claims

ABSTRACT OF THE DISCLOSURE

This invention relates to a chemical feeder suitable for use with bodies of water such as swimming pools. Its purpose is to hold and adjustably regulate the quantity of a slowly soluble material which is dissolved into a body of water per unit of time. The feeder includes a float member which floats atop the water and which has engaged to it a container member having a cavity therein which contains the said material. The said material will frequently be a chlorine-release material in the form of relatively small pellets. The container member has a bottom wall and a side wall, and its elevation relative to the float, and thereby relative to the surface of the water, is vertically adjustable. A port enters the cavity through one of the walls at a level below the surface of the water so that the water will rise in the cavity to the same level as that of the surface. The amount of surface area of the material which is exposed to solution by the water is adjustable at least in part by raising and lowering the container member, because the water level will thereby be higher or lower in the stack of material in the container member. The size of the container member permits a substantial reserve supply of the material above the water level so that as the material is dissolved below the water level, additional material falls by gravity to a level below the water surface so as to maintain sensibly constant the available surface area of material available to be dissolved.

CROSS-REFERENCE TO OTHER APPLICATIONS

This is a continuation of applicant's co-pending U.S. patent application, Ser. No. 719,455, filed Apr. 8, 1968, entitled "Chemical Feeder," which is abandoned.

This invention relates to a feeder for holding and adjustably regulating the quantity of a slowly-soluble material which is dissolved into a body of water per unit of time.

Feeders for introducing water treatment chemicals into bodies of water such as swimming pools have long been known, including some feeders which float atop a body of water. Most of these prior art feeders have a substantial disadvantage in that they customarily provide a floating container in which all of the material ultimately to be dissolved is always in contact with the water. The effect over a period of time is to reduce the surface area of the material which is to be dissolved as the process of solution proceeds, and there is no means to regulate the device to compensate for this. Therefore the rate of introduction of material into the water decreases over a period of time. Because there is no means provided to regulate the rate of introduction of the material into the solution (customarily these devices suffer either the foregoing disadvantage or one which is perhaps worse—that they tend to discharge substantially saturated solutions), the rate of introduction of material into solution cannot be controlled effectively by a simple and inexpensive conventional device.

It is an object of this invention to provide a two-piece device which can be inexpensively manufactured and which can give over extended periods of time a substantially constant rate of introduction of soluble material into a body of water per unit of time. Moreover, the quantity which is dissolved per unit of time is readily and quite accurately regulable.

This invention is carried out by providing a container member for containing the material to be dissolved, this container having a bottom wall and a side wall so as to contain the material. The device also includes a float member, the two members being adapted for engagement to each other so that the elevation of the container member relative to the float member can be adjustably varied so that an adjustably selectible proportion of the container member stands beneath the surface. The float member is sufficiently buoyant to support itself and the container member with material therein on the surface. A port enters the cavity through one of said walls at a level beneath the surface when the assembly of the members rests upon the said surface. When water rises in the container member to the elevation of the surface, the surface area of material submerged and exposed to water is at least in part a function of the distance to which the container member projects beneath the surface. A substantial volume of cavity is included which stands above the surface, and in which a reserve quantity of material can be stored out of contact with the water, which reserve material falls by gravity below the surface level of the water as the material beneath the surface is dissolved.

According to a preferred but optional feature of the invention, engagement means is provided for holding the two members together.

According to still another preferred but optional feature of the invention, the float member is ring-shaped, with a central aperture, and the container member is held in the said central aperture.

The above and other features of this invention will be fully understood from the following detailed description and the accompanying drawings in which:

FIG. 1 is a side elevation, partly in cutaway cross-section, showing the float member of the invention;

FIG. 2 is a top view of FIG. 1 taken at line 2—2 thereof;

FIG. 3 is a front elevation of the presently preferred embodiment of the container member of the invention;

FIG. 4 is a rear elevation of FIG. 3, partly in cutaway cross-section;

FIG. 5 is a cross-section taken at line 5—5 of FIG. 3;

FIG. 6 is an axial cross-section taken at line 6—6 of FIG. 8;

FIG. 7 is a fragmentary elevation, partly in cutaway cross-section, showing another embodiment of the invention; and FIG. 8 is a side elevation, partly in cutaway cross-section, showing the assembled chemical feeder of the invention on the surface of a body of water.

FIG. 1 shows a float member 10 which is a buoyant structure preferably made of a skin of lightweight water-impermeable material such as polypropylene, with a substantial void 11 therein sufficient to give the requisite buoyancy. The float member is preferably ring-shaped as can best be seen in FIG. 2 and has a central aperture 12 therein. The device has a central axis 13 which is vertical when the float is in the water. Preferably this float member is relatively large in plan view so that, as the soluble material dissolves and the assembly becomes lighter, the change in submerged depth is minimized. A tall narrow ring float might change as much as a few inches, while a broad 16" diameter ring float has been found to change by only about 3/8" from a full load to a completely empty condition. Engagement means 14 comprising a ring-shaped circumferential rib is formed medially in the central aperture in the wall thereof.

The presently preferred embodiment of container for this device is shown in FIGS. 3–6. This container member 20 includes a substantial interior cavity 21 and has a central axis 22. The construction has a bottom wall 23 and a side wall 24 with an open top 25 adapted to be closed by a cap 26 which makes a friction fit, or preferably a snap fit by the use of a ring-shaped groove 27 and a ring-shaped rib 28 as best shown in FIGS. 4 and 6. The cap has a relief hole 29 which, prior to placing the device in use, will be closed by a seal 30 which may be a piece of tape or the like.

The side wall of the container carries engagement means 31 which constitutes a plurality of ring-shaped shoulders 32 with grooves 33 between each pair. Their diameters are such that the engagement means 14 can enter into a groove 33 between pairs of shoulders to hold the devices together. There will be enough springiness in the wall of the central aperture or in the wall of the container member to enable any of these grooves 33 to be selected simply by forcing the member axially. The shoulders provide additional rigidity to the container member.

The container member is conveniently blow-molded, and the cap may initially be formed unitarily with the remainder of the device and later cut off at its lower end and then forced over the upper end of the bottom portion.

A gauge 34 may be provided in the form of graduations to indicate to the user the level to which the device is adjusted. This is a convenience to the user because the container members will ordinarily be provided as throw-away items and their removal and replacement with a new container member to an established adjustment will be facilitated by such a gauge.

In the other side of the side wall is provided an axially-extending ridge 40 which, as can best be seen in FIG. 5, has a re-entrant portion, which enables the ridge to be snipped off by scissors so as to form a port through the side wall to permit the access of water to material which lies beneath the surface of the water. However, until the seal 30 is removed and a port is formed in the wall of the container member, the container member is closed and contains, sealed from the atmosphere and any moisture, a quantity of a slowly-soluble material 50, preferably in the form of small pellets rather than in the form of one large stick or rod. The use of pellets is to be preferred over rods, or over powders which may cake to form a single large body. A pile of relatively small, preferably pelletized, articles which do not tend to form a cake best tends to present a sensibly constant surface area to water of solution as the supply beneath the water is replenished by material above that presses down on the top of the pile.

Typical substances for use in supplying chlorine in swimming pools are chlorinated cyanurates, and of these it has been found that a four-pound container occupying approximately two quarts of volume will function for between about four to six weeks to provide a substantially constant supply of chlorine per unit time. Of course any other slow-dissolving chemical can be provided for the same or other purposes, and in other uses than for treating swimming pool water. Sanitation and water clarification or softening are other examples.

The engagement means may merely be frictionally engaged walls made by forming the outer wall of the container means somewhat larger than the inner wall of the central aperture 12. However, the preferred embodiment is the circular ridge construction shown in FIGS. 4–6 and still another embodiment is the helical construction shown in FIG. 7 which has helices 55 which form fragments of threads which are engaged by other helices or parts thereof, such as helically-oriented projections raised in the wall of the central aperture 12. In all of these embodiments, the elevation of the container means relative to the float member is readily adjustable by sliding, turning or pushing the container member relative to the float member.

The use of the device should be evident from FIG. 6. The ridge is cut off at a level which will stand below surface 56 of the pool 57 of water, and preferably for a substantial length, such as 4½ inches, the port formed should be about 1/8" wide for best results in a container member about 3½" in diameter. Then the seal 30 is removed and when the assembly is placed in the water, it will float and water will enter through the submerged port and rise inside the container member to the level of surface 56. The cavity extends substantially above this surface and provides substantial room for supply of reserve material so that as the material dissolves beneath the surface of the water, new material will press down and fill in the spaces resulting from the dissolution of the material. Use of relatively small pellets assures the replacement from above as those below are consumed, and the surface exposed to water is sensibly constant.

The flow of the liquid with the dissolved material in it to the pool is caused in part by the increased specific gravity of the liquid which permits the solution to drain out the port. Also the tendency of any solution to seek equal concentration, whereby the concentrated solution will flow toward the regions of lesser concentration is important. Furthermore, natural convection resulting from normal flow patterns in pools will assist. The result is a substantially constant flow over a sensibly constant surface area of material which is maintained sensibly constant by the fact that material with additional surface for dissolution purposes is supplied as the other material is dissolved away. In tests it has been shown that the chlorine released by a chlorinated cyanurate is substantially directly proportional to the volume of the cavity which is beneath the surface of the pool, and that doubling the volume of the cavity which is below the surface will substantially double the output.

The foregoing is especially accurate when the long vertical slot is used for the port. However, it is also possible simply to use holes in the bottom wall or in the side wall, and at any elevation that is beneath the surface of the water, preferably, however, near the bottom. However, with holes the proportional range is more limited. For example, starting with a 1/16" diameter hole, a given emission rate is achieved. As the hole size is increased, the emission rate increases almost directly proportionally until a hole diameter of 1/4" is passed, beyond which enlarging the hole makes no difference.

If, instead of enlarging the hole, more small holes of the same size are added, there is a number of holes which represents a maximum emission rate. More holes make no difference in emission rate.

If a hole is used, it will be noted that there is a submergence depth range in which proportional emission change occurs, beyond which deeper submerge makes little difference. These ranges are additive, and a plurality of vertically aligned holes can produce a broad range of emission rates.

The ultimate and preferred embodiment is the elongated, narrow slot. In this embodiment there is a nearly straight-line relationship between emission (solution rate) of dissolved material and depth of submergence.

There is thereby provided a feeder with a remarkably constant output which requires little or no attention when once properly set, which can maintain a stock of reserve material which is sufficient for a suitably long term of use, and which can be packaged in a throw-away device which is inexpensive to manufacture and safe and convenient to handle.

This invention is not to be limited by the embodiments shown in the drawings and described in the description which are given by way of example and not of limitation, but only in accordance with the scope of the appended claims.

What is claimed:

1. A feeder for holding and adjustably regulating the quantity of a slowly-soluble solid material which is dissolved into a body of water per unit of time, said body of water having a surface, said feeder comprising: an elongated substantially vertical container member having a cavity therein for containing said solid material, said container member having a bottom wall and a side wall; a float member adjustably engaging said container member, the container member being adapted for vertical adjustment with said float member so that the elevation of the container member relative to the float member can be adjustably varied in order that an adjustably selectible proportion of the container member stands beneath the surface of the body of water, the float member being sufficiently buoyant to support itself and said container member with said solid material therein on the surface; and a port in the wall of the container member providing liquid communication between the cavity and the body of water at a level beneath the surface when the assembly of the members rests upon the said surface, whereby water rises in said container member to the elevation of the surface, the surface area of solid material submerged and exposed to water being a function of the distance the container member projects beneath the surface, there being a substantial volume of cavity above the surface elevation in which to store reserve material out of contact with water which can fall into a lower level of the container member and be contacted by the water as the material below it is dissolved.

2. A feeder according to claim 1 in which the engagement of the member is frictional.

3. A feeder according to claim 1 in which one of the members carries an engagement means which engages the other of the members.

4. A feeder according to claim 1 in which the members carry mutually engaging shoulders, one of said members carrying a plurality thereof for engagement of the members.

5. A feeder according to claim 1 in which the members carry mutually engaging portions of helical thread for engagement of the members.

6. A feeder according to claim 1 in which the container member includes a removable cap with a relief hole therethrough which cap can be applied to the container member with the relief hole closed in order to enclose a quantity of said solid material therein, and in which the side wall is provided with a closed bulge adapted to be cut off to provide said port at the time of installation.

7. A feeder according to claim 1 in which the port is an elongated axial slot in the side wall.

8. A feeder according to claim 1 in which the float member is ring-shaped with a central aperture, and in which the container member is in the said central aperture.

9. A feeder according to claim 8 in which the engagement of the members is frictional.

10. A feeder according to claim 8 in which one of the members carries an engagement means which engages the other of the members.

11. A feeder according to claim 8 in which the members carry mutually engaging shoulders, one of said members carrying a plurality thereof for engagement of the members.

12. A feeder according to claim 8 in which the container member includes a removable cap with a relief hole therethrough, which cap can be applied to the container member with the relief hole closed in order to enclose a quantity of said solid material therein, and in which the side wall is provided with a closed bulge adapted to be cut off to provide said port at the time of installation.

13. A feeder according to claim 8 in which the port is an elongated axial slot in the side wall.

14. A feeder according to claim 12 in which the engagement of the members is frictional.

15. A feeder according to claim 12 in which one of the members carries an engagement means which engages the other of the members.

16. A feeder according to claim 12 in which the members carry mutually engaging shoulders, one of said members carrying a plurality thereof for engagement of the members.

17. A feeder for holding and adjustably regulating the quantity of a slowly-soluble material which is dissolved into a body of water per unit of time, said body of water having a surface, said feeder comprising: a substantially vertical elongated container member having a cavity therein for containing said material, said container member having a bottom wall and a sidewall; a ring-like float member, having a central substantially vertical aperture, said container member being adapted for vertically adjustable engagement in said central aperture so that the elevation of the container member relative to the float member can be adjustably varied so that an adjustably selectible proportion of the container member stands beneath the surface, the float member being sufficiently buoyant to support itself and said container member with material therein on the surface; and a vertically elongated port in the lower portion of the side wall of said container, said port being positioned such that a greater or lesser portion is exposed to the body of liquid as said container is vertically adjusted downwardly or upwardly, respectively, in said central aperture, whereby water rises in said container member to the elevation of the surface, the surface area of material submerged and exposed to water being at least in part a function of the distance the container member projects beneath the surface, there being a substantial volume of cavity above the surface elevation in which to store reserve material which can fall into the water as the material below it is dissolved.

18. A feeder according to claim 17 in which the engagement of the members is frictional.

19. A feeder according to claim 17 in which one of the members carries an engagement means which engages the other of the members.

20. A feeder according to claim 17 in which the members carry mutually engaging shoulders, one of said members carrying a plurality thereof for engagement of the members.

21. A feeder according to claim 17 in which the members carry mutually engaging portions of helical thread for engagement of the members.

22. A feeder according to claim 17 in which the container member includes a removable cap with a relief hole therethrough, which cap can be applied to the container member with the relief hole closed in order to enclose a quantity of said solid material therein, and in which the side wall is provided with a closed bulge adapted to be cut off to provide said port at the time of installation.

(References on following page)

References Cited

UNITED STATES PATENTS

| | | | |
|---|---|---|---|
| 370,798 | 10/1887 | Mackintosh | 23—267A |
| 444,500 | 1/1891 | Meyer | 210—242X |
| 537,141 | 4/1895 | Bragonier | 23—267A |
| 2,148,180 | 2/1939 | Teiger | 23—267A |
| 2,292,673 | 8/1942 | Taylor | 23—267A |
| 2,826,484 | 3/1958 | Buehler | 23—267A |
| 2,976,129 | 3/1961 | Buehler | 23—267A |
| 3,107,156 | 10/1963 | Fredericks | 23—267A |
| 3,202,322 | 8/1965 | Cleary | 23—267AX |
| 3,423,182 | 1/1969 | Klosky | 210—169X |
| 3,483,989 | 12/1969 | Gopstein | 23—267AX |

FOREIGN PATENTS

| | | | |
|---|---|---|---|
| 13,556 | 1907 | Great Britain | 210—242 |
| 232,293 | 1925 | Great Britain | 210—242 |
| 531,537 | 1954 | Belgium | 23—267A |
| 1,057,865 | 1967 | Great Britain | 4—227 |

NORMAN YUDKOFF, Primary Examiner

S. J. E. MEVY, Assistant Examiner

U.S. Cl. X.R.

23—267E, 311; 210—169, 242; 239—310; 4—228, 172.15; 222—163

PO-1050
(5/69)

UNITED STATES PATENT OFFICE
CERTIFICATE OF CORRECTION

Patent No. 3,598,536          Dated   August 10, 1971

Inventor(s) JOHN W. CHRISTENSEN

It is certified that error appears in the above-identified patent and that said Letters Patent are hereby corrected as shown below:

Heading on drawings:

"Aug. 8, 1968" should be --Apr. 8, 1968--

Column 1, line 4, "Aug." should be --Apr.--

Signed and sealed this 26th day of June 1973.

(SEAL)
Attest:

EDWARD M. FLETCHER, JR.                    ROBERT GOTTSCHALK
Attesting Officer                          Commissioner of Patents